(12) United States Patent
Baker

(10) Patent No.: US 7,125,472 B2
(45) Date of Patent: Oct. 24, 2006

(54) SLOTTED SCREEN FOR DIGESTER

(75) Inventor: Jack T. Baker, P.O. Box 116, Greenwich, NY (US) 12834

(73) Assignees: Jack T. Baker, Greenwich, NY (US); Myles M. Miller, Glens Falls, NY (US)

( * ) Notice: Subject to any disclaimer, the term of this patent is extended or adjusted under 35 U.S.C. 154(b) by 192 days.

(21) Appl. No.: 10/193,500

(22) Filed: Jul. 11, 2002

(65) Prior Publication Data
US 2004/0007343 A1    Jan. 15, 2004

(51) Int. Cl.
    D21C 7/08    (2006.01)
    D21D 5/16    (2006.01)
(52) U.S. Cl. .................. 162/251; 162/233; 162/55; 210/498
(58) Field of Classification Search .............. 162/251, 162/233, 237, 55; 210/498, 499, 415, 497.3; 209/270, 273, 303–306, 397; 29/896.62
See application file for complete search history.

(56) References Cited

U.S. PATENT DOCUMENTS

| | | | |
|---|---|---|---|
| 4,795,560 A | 1/1989 | Chupka et al. ........ | 210/497.01 |
| 5,069,752 A | 12/1991 | Richter ................ | 162/37 |
| 5,236,554 A | 8/1993 | Greenwood ............ | 162/238 |
| 5,638,960 A * | 6/1997 | Beuermann et al. ..... | 209/397 |
| 5,662,775 A | 9/1997 | Marcoccia et al. ..... | 162/41 |
| 5,849,151 A | 12/1998 | Marcoccia et al. ..... | 162/42 |
| 6,039,841 A | 3/2000 | Hernesniemi .......... | 162/251 |
| 6,119,867 A | 9/2000 | Ljokkoi et al. ....... | 209/273 |
| 6,129,816 A | 10/2000 | Sheerer et al. ....... | 162/237 |
| 6,165,323 A * | 12/2000 | Shearer .............. | 162/251 |
| 6,284,145 B1 | 9/2001 | Andersson ............ | 210/767 |
| 6,340,805 B1 | 1/2002 | Ljokkoi .............. | 219/58 |
| 6,344,112 B1 | 2/2002 | Hernesniemi ......... | 162/251 |

FOREIGN PATENT DOCUMENTS

| | | | |
|---|---|---|---|
| EP | 0 287 267 | * | 10/1988 |
| WO | 93/07334 | * | 4/1993 |

\* cited by examiner

*Primary Examiner*—Eric Hug
(74) *Attorney, Agent, or Firm*—Drinker Biddle & Reath LLP

(57) ABSTRACT

A screen panel for a wood-chip digester, comprises a screen plate having a plurality of slots therein that are curved in the form of an arc. Each slot has a generally parallel-sided middle portion in the middle of the thickness of the screen plate, which middle portion has a width in the range of from 3 mm to 10 mm, and a portion that tapers out at an angle on each side of the middle portion, at a half-angle in the range of from 10° to 20°, for approximately one quarter of the thickness of the plate. All of the slots have their concave sides facing in the upstream direction of chip flow in the digester.

3 Claims, 5 Drawing Sheets

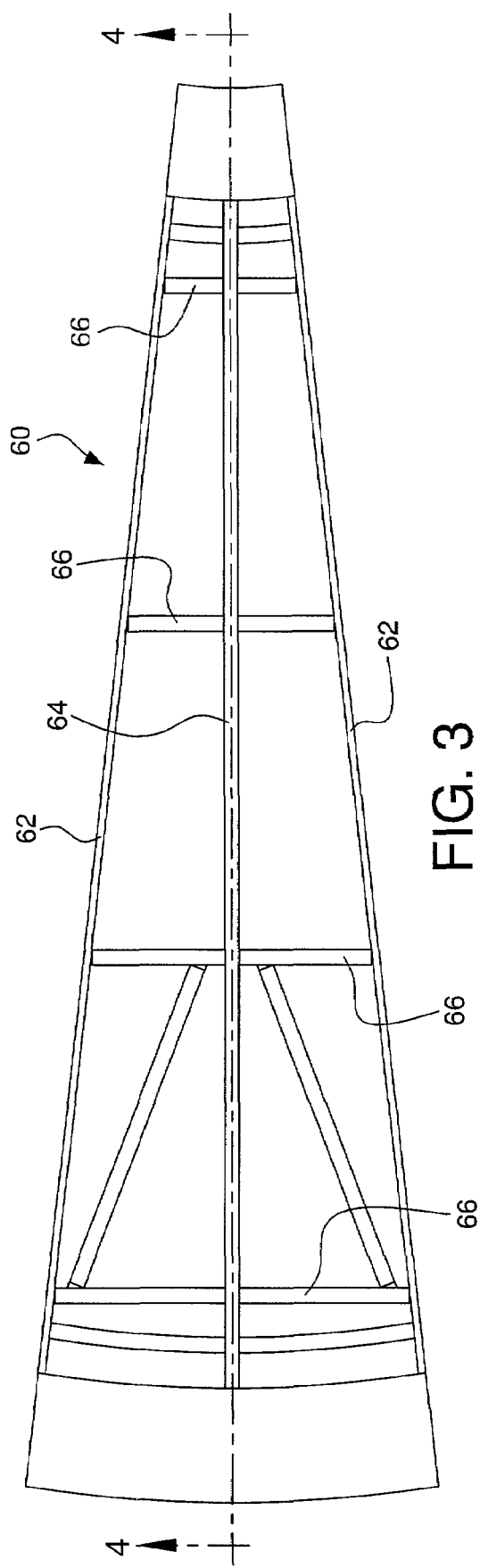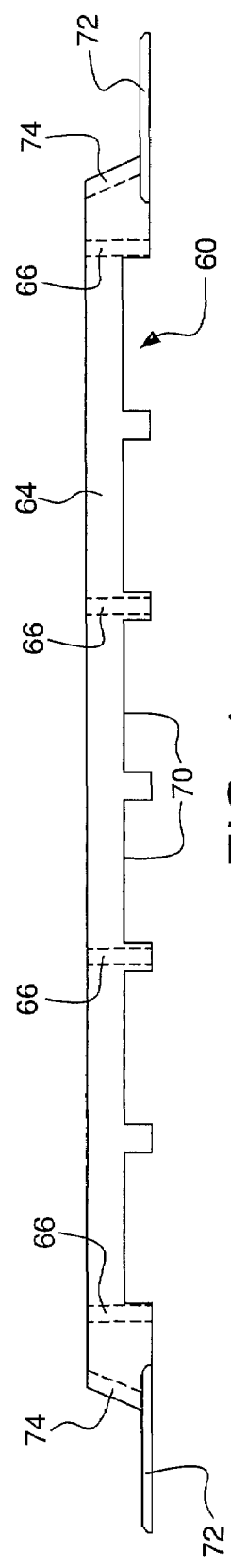

SLOTTED SCREEN FOR DIGESTER

FIELD OF THE INVENTION

The invention relates to digesters for wood-chips, and especially to a slotted screen for use in such a digester.

BACKGROUND OF THE INVENTION

A digester is a vessel in which wood chips are treated with heat, liquid, and chemicals in order to break down the chips into a pulp that can be further processed into paper, paperboard, or the like. The digester is typically an upright cylinder with a conically tapering or domed top end. A batch of wood chips may be loaded into the digester and then pulped, or wood chips may be continuously loaded in at the top end and pulp continuously removed at the bottom. The cooking liquor is continuously pumped into and out of the digester, so that its temperature and chemical content can be maintained.

In order to allow free circulation of the cooking liquor into and out of the digester, while keeping the chips within the digester, perforated metal screen plates are provided, spaced a short distance inward from the walls of the digester. These screen plates define and separate a central volume, containing the wood chips, and an annular space, acting as a manifold by means of which the liquor can be distributed and collected. The screen plates are typically made of stainless steel, and the perforations in the screen plates are typically circular holes.

For practical reasons, the screen typically consists of a circle of from 16 to 24 panels, each individually mounted on and removable from supports within the digester. The panels are usually curved so that they together form a cylinder or a truncated cone, depending on where in the digester they are to be installed. For example, in the conical top of a digester there may be 20 panels, each about 60" (1.5 m) long, 6.5" (165 mm) wide at the narrow end, and 20" (500 mm) wide at the wide end, forming a cone about 40" (1 m) in diameter at the narrow end and about 125" (3.25 m) in diameter at the wide end. The panels may instead be rectangular or trapezoidal, forming a multi-sided prism or pyramid. These panels are easier to fabricate and, especially if the number of panels in the circle is large, form an adequate approximation to a cone or cylinder for many purposes.

As an alternative to holes, it has been proposed to use screen plates with straight slots angled obliquely. Examples of such screen plates are shown in U.S. Pat. Nos. 6,039,841 (Hernesniemi) and 6,165,323 (Shearer), both assigned to Ahlstrom.

SUMMARY OF THE INVENTION

The present invention in one aspect provides a digester screen with curved slots. The slots have a nominal width of from 3 mm (0.12" ) to 10 mm (0.4"), preferably around 5 mm (0.2"). The slots are most preferably substantially circular arcs with a radius of curvature of from 1.5" (38 mm) to 3" (75 mm), preferably around 1.5". The slots may be formed with both sides in curves of equal diameter. In that case, the centers of curvature of the two sides are preferably separated by the nominal width of the slots. The slots are then of their nominal width at the center, and slightly narrower at the ends.

The slots may have semicircular ends, and may have a length of from 1" (25 mm) to 3" (75 mm) preferably around 1.5" (38 mm) between imaginary parallel lines tangent to the ends of the slot. Each slot is preferably oriented approximately square on to the lengthwise direction of the digester, with its concave side towards the top (the narrow end of a conical screen). The exact alignment is not critical, and for ease of manufacture all the slots in one panel of a conical screen may be aligned perpendicular to the center line of the panel. The slots are preferably arranged in lengthwise rows, with a pitch spacing of from ⅜" (9.5 mm) to ¾" (19 mm), preferably around 0.447" (11.35 mm), and a gap of from ⅛" (3 mm) to ½" (12.5 mm), preferably around ⅛", between rows. At the sides of a tapered panel for a conical screen, some of the slots will be truncated. Those slots are preferably arranged with their inner ends in the position dictated by the regular array of slots, and their outer ends terminating in a semicircular end wherever they meet the edge of the slotted part of the screen plate.

The present invention in another aspect provides a digester screen with slots that open from a nominal width towards both faces of the screen plate. The slots preferably have their nominal width for the middle half of the thickness of the screen plate, and widen with a half-angle of taper of from 5° to 30°, preferably from 10° to 20°, especially around 15°, for preferably around a quarter of the thickness of the sheet on each side. Thus, if the sheet is ¼" (6.35 mm) thick, the slot will have a parallel-sided section of the nominal width for ⅛" (3.2 mm) and two tapered sections each 1/16" (1.6 mm) deep.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim. In the drawings:

FIG. 3 is a view similar to FIG. 2, showing the frame on which the screen plate is mounted.

FIG. 4 is a section along the line 4—4 in FIG. 3.

DETAILED DESCRIPTION OF THE DRAWINGS

Figure 1:
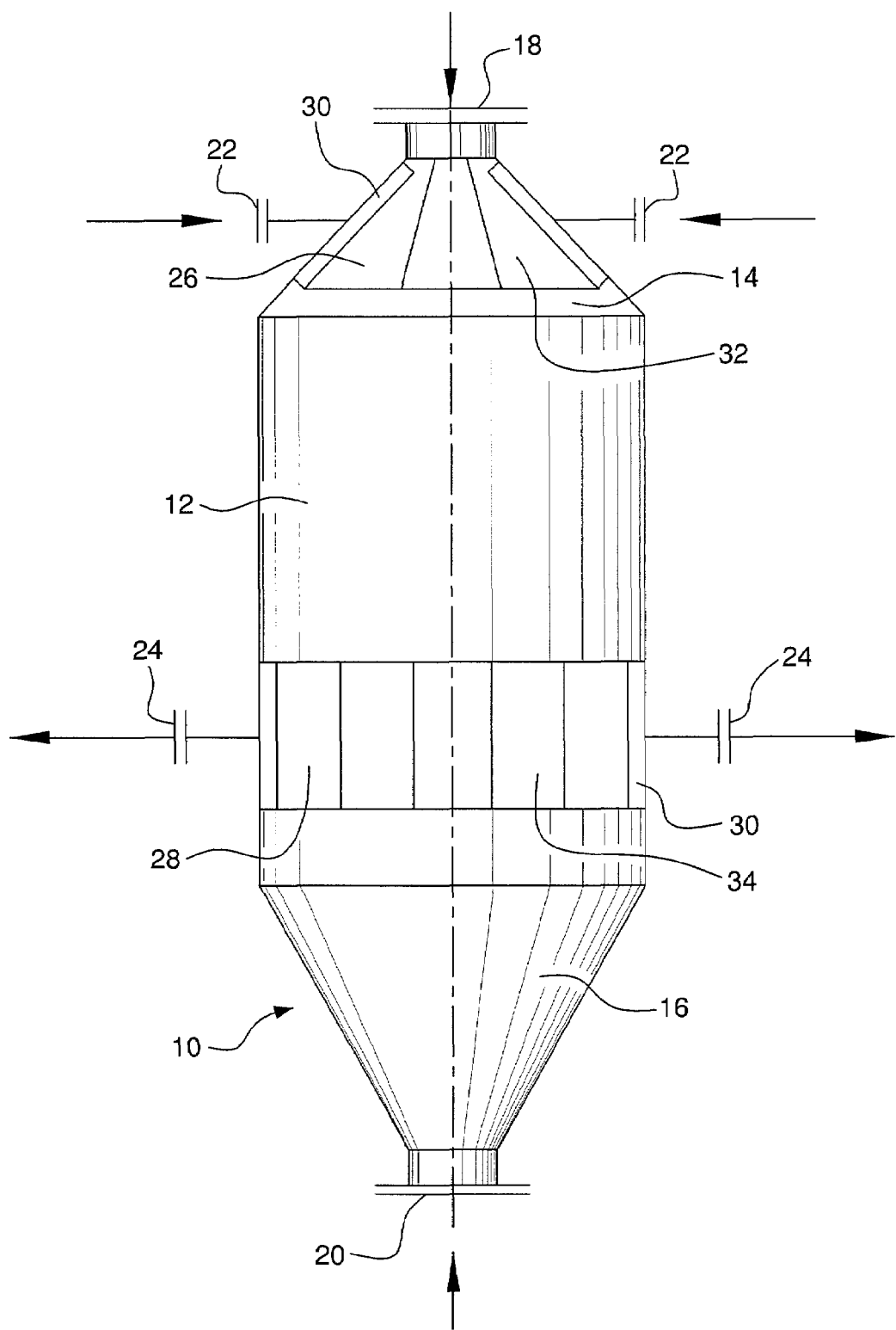
FIG. 1 shows a schematic elevational view of a digester.

Referring to the drawings, and initially to FIG. 1, one form of digester indicated generally by the reference numeral 10 has a generally cylindrical body 12, mounted in an upright position, with conical top and bottom ends 14 and 16. The body 12 is typically about 12 to 16 feet (3.5 to 5 meters) in diameter, and the digester is typically about 40 to 70 feet (12 to 20 meters) high.

An inlet 18 for wood chips to be digested is provided at the center of the top end 14. An outlet 20 for digested wood chips, which also serves as an inlet for liquor during the cooking cycle, is provided at the center of the bottom end 16. Further inlets 22 and outlets 24 for cooking liquor are provided in the top end 14 and the cylindrical body 12, respectively. In use, the liquor inlets and outlets are connected by appropriate pipe-work to pumps, heaters, and other apparatus for maintaining the temperature, pressure, flow rate, and chemical composition of the circulating liquor. All of that apparatus may be conventional and, in the interests of conciseness, is not further shown or described here.

In order to prevent the wood chips from entering the liquor circulation system, the inlets and outlets 22 and 24 are covered by perforated metal screens 26 and 28, respectively. The screen 26 is generally conical, conforming to the conical shape of the top end 14 of the digester 10. The screen 28 is generally cylindrical, conforming to the cylindrical shape of the body 12 of the digester. In order to promote an even distribution of liquor around the digester 10, the screens 26 and 28 are spaced inward from the walls of the digester 10, forming an annular plenum 30.

For practical reasons, each of the screens 26 and 28 preferably consists of a number, typically 18 to 24, of screen panels 32 and 34, respectively. The panels 32 of the screen 26 are trapezoidal, each forming an identical wedge of the conical screen 26. As will be explained in more detail below, the panels 32 are preferably curved, so that they form sectors of a frustoconical screen surface. Instead, the panels 32 may be flat, so that they in fact form an 18 to 24 sided truncated pyramid. Similarly, each of the panels 34 of the screen 28 is preferably a sector of a cylinder, but the panels 34 may instead be flat, so that the screen 28 is an 18 to 24 sided prism.

In operation of the digester 10, wood chips are loaded in through the top inlet 18. Liquor may also be introduced through the top inlet at this time. Once the chips have been loaded, the digester is closed, and the cooking cycle begins. The process of digesting wood chips is well known and, in the interests of conciseness, is not further described here. During the cooking cycle, hot liquor is typically introduced into the digester through the inlets 20 and 22 and removed through the outlets 24. However, the liquid flow pattern may be reversed or otherwise varied. In particular, the flow pattern is preferably sequenced so that the top inlets 22 serve as outlets, and the body outlets 24 serve as inlets, for some part of the cooking cycle.

Figure 2:
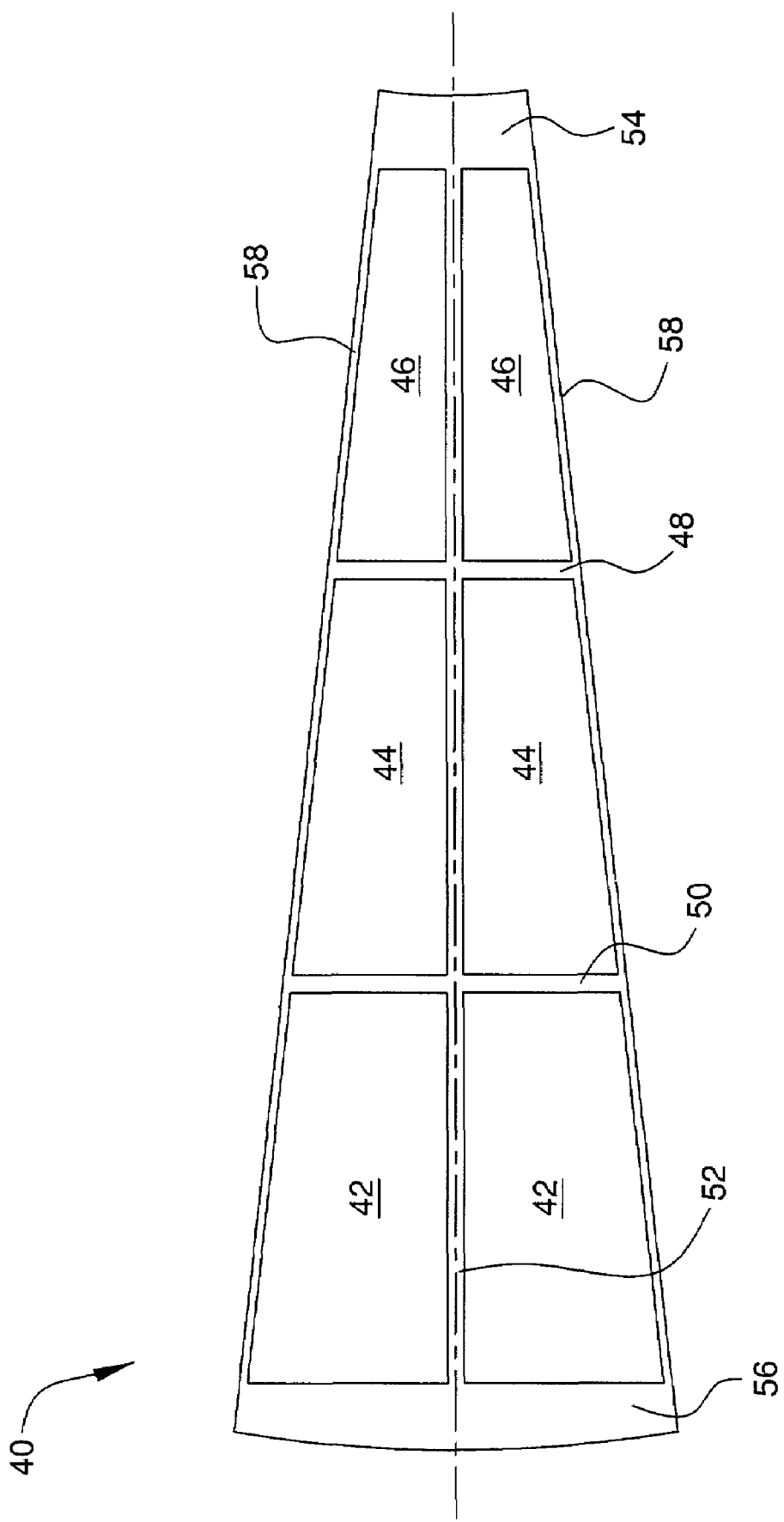
FIG. 2 shows a developed view of a screen plate for the conical part of a digester.

Referring now to FIGS. 2 to 4, one form of screen panel 32 for the conical top 14 of a digester 10 comprises a screen plate indicated generally by the reference numeral 40. In use, the panel is shaped as a sector of a truncated cone, but in the interests of clarity is shown in the drawings developed onto a plane. The screen plate 40 consists essentially of six slotted sections 42, 44, 46 separated by unperforated areas 48, 50, 52 and with unperforated borders 54, 56, 58 for mounting on a frame indicated generally by the reference numeral 60. The screen plate consists of a sheet of ¼" (6.35 mm) thick stainless steel, preferably duplex 2205. For ease of design and fabrication, the slotted sections are trapezoidal. To adapt the trapezoidal shape of the slotted area to the conical shape of the finished panel, the borders 54 and 56 at the ends of the screen plate are broad, and have curved outer ends.

The frame 60 comprises longitudinal edge members 62, a longitudinal center member 64, and cross members 66, which define between them spaces corresponding to the slotted areas of the screen plate 40. The frame members rest against the wall of the digester, ensuring the location of and support for the screen plate, but have parts cut away, as shown at 70 in FIG. 4, to allow liquor to circulate through them as desired. As may be best seen from FIG. 4, the frame members 62, 64, 66 are wider perpendicular to the screen plate than parallel to the screen plate, so that they define a substantial space between the outside of the screen plate 40 and the inside of the digester wall within which liquor can circulate. It will be appreciated that, by providing some frame members with cutouts 70 and some without cutouts, the annular space between the screen plates 40 and the digester wall may be subdivided into distinct sections as desired. These sections may then be used as manifolds for inlets and outlets for cooking liquor in accordance with the design of the particular digester.

At each end of the panel, the frame comprises a plate 72 that in use lies flat against the wall of the digester, and is clamped down to hold the panel in place. The arrangements for clamping the panel may be conventional and, in the interests of conciseness, are not further described here. At the end of each clamping plate 72 nearer the middle of the panel, an angled fairing plate 74 connects the clamping plate to the level of the radially inner edges of the frame members 62, 64, 66. The fairing plates 74 follow the curve of the clamping plates 72. When the screen panel is assembled, the broad end borders of the screen plate 40 cover the space between each fairing plate 74 and the nearest frame cross member 66. The unperforated parts of the screen plate 40 may be welded to the frame members 62, 64, 66, and 74.

Figure 5:
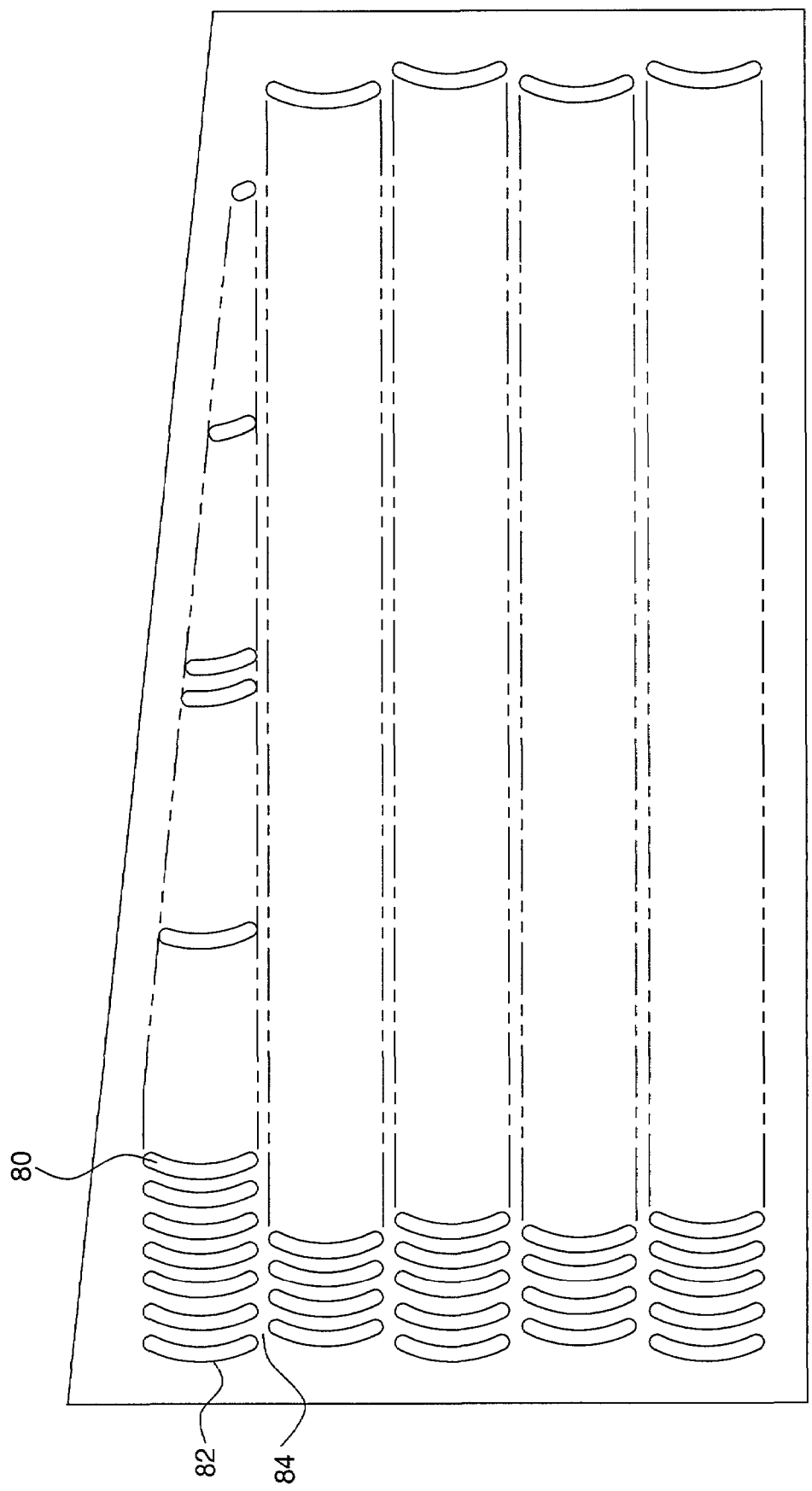
FIG. 5 shows an enlarged developed view of one of the screen sections of the screen plate shown in FIG. 2.
Figure 6:
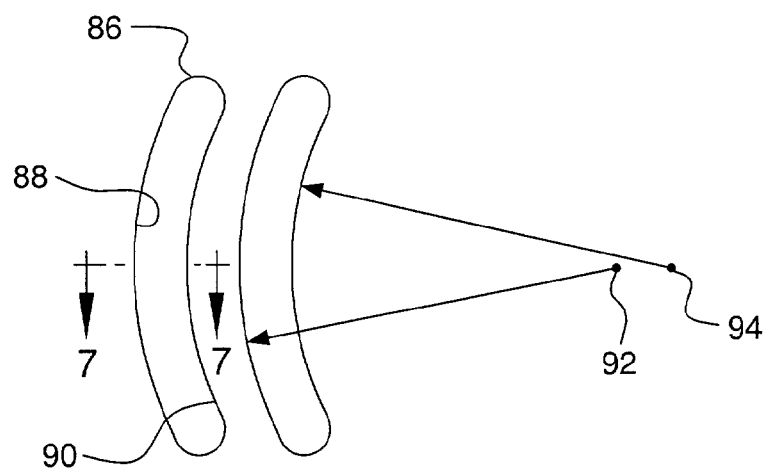
FIG. 6 is a further enlarged detail of FIG. 5.
Figure 7:
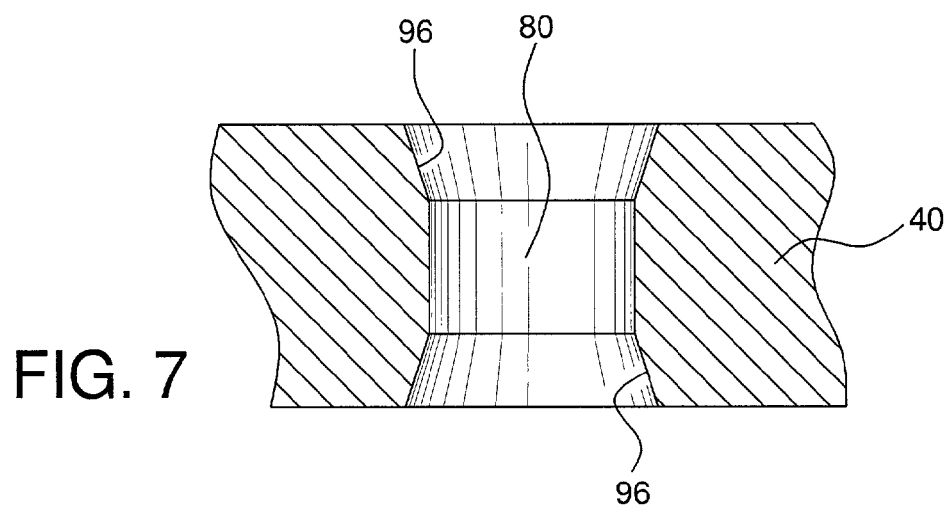
FIG. 7 is a section along the line 7—7 in FIG. 6.

Referring now especially to FIGS. 5 to 7, a typical one 42 of the slotted areas of the screen plate 40 has numerous curved slots 80, arranged in rows 82 separated by unslotted lands 84. The slots are arranged with their end-to-end extent perpendicular to the axial centerline of the screen plate 40, and with their concave sides facing towards the narrow end of the screen plate. The rows 82 and the lands 84 run parallel to the axial centerline of the screen plate 40. As a result, the outermost row 82 is cut off obliquely by the outer unperforated border 58. The slots 80 in that row, to the extent that they are within the slotted area, follow the regular pattern of slots. The slots in alternate rows 82 are offset axially from one another by half the slot pitch.

Each slot 80 is an arc of a circle of approximately 1.5" (38 mm) radius and 0.197" (5 mm) wide, with semicircular ends 96. Each slot has a chord length (measured along a straight line between notional parallel tangents to the two ends) of approximately 1.5" (38 mm). As shown in FIG. 6, if the slots are cut out, it may be preferred to form the sides 88, 90 as arcs of equal radius with offset centers. The centers 92, 94 of the arcs 88, 90 are then 0.197" apart, and the slots are then 0.197" wide in the middle, and slightly narrower towards the ends. The pitch spacing of the slots 80 along each row 82 is then approximately 0.447" (11.35 mm). The lands 84 separating the rows of slots are approximately 0.125" (3 mm) wide between the notional lines tangent to the ends of the slots 80 on either side.

The size of the slots is determined by the size of the chips that need to be handled in a particular application. For fine chips, for example, slots with a radius of 1" to 1.25" (25 to 30 mm) and a width of 0.125" to 0.156" (3 to 4 mm) may be appropriate. The preferred shape of the slots is substantially an arc of a circle because the curve prevents a thin, flat chip from passing through by aligning itself with the slot. If the slot were of a more complicated shape it would be the maximum radius that would determine the largest chip that could pass through. Thus, circular arc slots allow a less delicate construction than other shapes for a given chip size.

The number of slots is determined by the required liquor flow rate through the screen 26 and the acceptable pressure drop across the screen, taking into account both the power consumption of the pumps that must generate the necessary pressure and the mechanical strength of the components that must support that pressure. A large safety margin, typically a safety factor of 2 or 2½, is included in the design, to allow for the fact that there may be significant obstruction of the slots by chips being processed.

Referring now especially to FIG. 7, each slot has the nominal width of 0.197" only through the middle half of the thickness of the metal sheet forming the screen plate 40. Towards both faces of the screen plate, the slot is widened by sloping surfaces 96 with a half angle of taper of 15° over approximately a quarter of the thickness of the sheet. The slots 80 are thus approximately 0.23" (5.8 mm) wide where they open out through the surface of the sheet. The slots may be formed by water-jet cutting, followed by machining to shape.

Surprisingly, it has been found that the curved slots and the slots widening towards both faces of the screen plate, and especially the combination of slots that both are curved and widen towards both faces of the screen plate, substantially reduces clogging of the screen by wood chips being digested. Without wishing to be limited to any particular theory, it is believed that wood chips lodge less readily in the curved slots than in straight slots or circular holes. It is believed that the widening shape of the slots allows any chips or pulp that have accumulated to be more easily dislodged by the wiping action of chips moving past the slot, especially in a continuous digester where there is a constant downward movement of chips. It is believed that the narrowing taper of the upstream ends of the slots accelerates the liquor flowing through the slots, while the widening taper of the downstream ends of the slots makes any trapped material easier to dislodge. The combination of these effects, which requires slots that are tapered at both sides of the plate and that are back-washed by serving as inlet screens for part of the digester cycle, enhances the washing action of the liquor flow to dislodge chips in the downstream ends of the slots.

It is found that if chips are allowed to remain lodged in the slots for a prolonged period of time, they tend to "bake on" to the screen, and must be either mechanically or chemically removed. It may therefore be preferred to adopt a flow sequence that includes comparatively frequent short periods of back-washing. Further, because the design of the slots 80 may permit an accumulation of larger chips on the inside of the screen 32 or 34, frequent back-washing may be preferred in order to keep the proportion of the slot area that is obstructed, and thus the pressure drop and flow impedance across the screen 32 or 34, within the designed operating range of the digester. In a batch digester, the normal sequence of operation typically uses the screens 32 and 34 as inlets and outlets at different parts of the batch cycle. This results in the screens being back-washed several times a day in normal use, which is found sufficient to keep them clear.

It will also be appreciated that the liquor used in the digester is re-circulated as much as possible, and the re-circulated liquor may carry with it solid bodies barely small enough to pass through the slots. Such solid bodies may lodge in the upstream ends of slots that are serving as inlets for the re-circulated liquor into the digester, which will consequently also benefit from back-washing by being used as outlets.

The shape of the slots also presents a lower resistance to liquor flow than conventional circular holes. This means that, for a given flow resistance, a lower proportion of the screen plate is needed for the open area of the slots than would be needed in the case of circular holes, and a higher proportion can be the metal between the slots. As a result, screen plates according to the present invention can be made considerably stronger than equivalent conventional screen plates.

Figure 8:
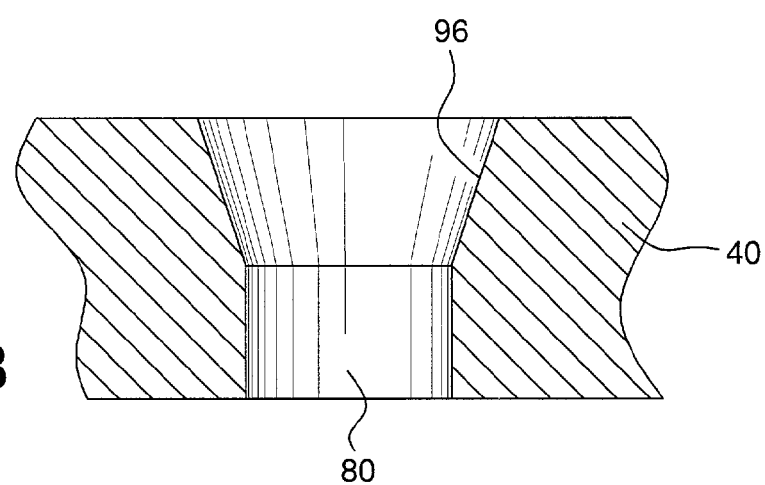
FIG. 8 is a view similar to FIG. 7 of an alternative form of screen.

Referring now to FIG. 8, in an alternative embodiment of the screen the slots 80 may have sloping surfaces 96 only at one face of the screen plate 40, and may have parallel sides extending out to the other face of the screen plate. In this embodiment the sloping surfaces 96 may have a half angle of taper of 15° and extend over up to half the thickness of the screen plate 40. Thus, if the screen plate 40 is ¼" (6.3 mm) thick and the slots have a nominal width of 0.197" (5 mm), the width between the tapered surfaces at the surface of the plate may be 0.264" (6.7 mm). In this embodiment, the screen plate 40 is positioned with the widened ends of the slots 80 at the face that is exposed to wood chips. If the screen panel in question is being used as an outlet for liquor from the digester, the wood chips may then be dislodged from the slots by back-washing.

Although a panel 32 of the screen 26 has been shown in, and described with reference to, FIGS. 2 to 8, it will readily be seen how the present invention may be applied to the panels 34 of the screen 28.

Although the invention has been described and illustrated with reference to exemplary embodiments thereof, it will be understood by those skilled in the art that various changes, omissions, and additions may be made thereto, without departing from the spirit and scope of the invention as recited in the attached claims.

The invention claimed is:

1. A batch wood-chip digester having a screen panel comprising a screen plate having a plurality of slots therein, wherein said slots are curved and have a width in the range of from approximately 3 mm to approximately 10 mm.

2. A digester according to claim 1, wherein all of the slots have their concave sides facing in the same direction, and said panel is installed in the digester with that direction being the upstream direction of chip flow.

3. A digester according to claim 1, wherein the slots have a generally parallel-sided portion having the said width in the range of from 3 mm to 10 mm in the middle of the thickness of the screen plate.

* * * * *